United States Patent Office 3,001,238
Patented Sept. 26, 1961

---

3,001,238
METHOD OF MAKING METAL BONDED CARBON BODIES
Walter V. Goeddel, San Diego, and Massoud T. Simnad, La Jolla, Calif., assignors, by mesne assignments, to the United States of America as represented by the United States Atomic Energy Commission
No Drawing. Filed Dec. 31, 1958, Ser. No. 784,071
7 Claims. (Cl. 18—54.7)

The present invention is directed generally to an improved method of making carbon bodies and in particular to carbon bodies which are particularly useful as construction material in nuclear reactors. The invention is more specifically directed to the production of mechanically strong carbon bodies having low permeability.

Heretofore, carbon bodies for use in reactors have been made by mixing carbon or graphite together with pitch and binders, after which the material is cold pressed into the desired form. After the cold pressing, the formed body is baked at an elevated temperature in order to vaporize the volatile materials. In order to achieve optimum density and lack of porosity in the final product, the baking must be carried on at slow rate and over an extended period of time and often the baking period extends over a number of days or even over several weeks. Attempts have been made to speed up the baking procedure; however, when this is done, the rate of evolution of gas and volatiles is so great that the resulting fuel body becomes quite porous. Also, with the known methods of fabrication, the green density and green strength (before baking) are greater than after baking or firing. In other words, the baking reduces the density and strength and results in a weaker, more porous product.

The porosity of the known carbon bodies causes considerable difficulty in reactor construction since unwanted diffusible fission products tend to migrate through the carbon. Accordingly, it is desirable to provide a carbon body that is strong and relatively non-porous.

Accordingly, it is the principal object of this invention to provide a carbon body which is relatively non-porous and mechanically strong. It is also an object of the invention to provide a method of making carbon bodies of the class described, which method can be accomplished at lower temperatures than those which have been heretofore employed, but which method at the same time will provide a resulting body which is stronger and more impervious to diffusible products than those made by the known methods. It is a further object of the invention to provide a method of making carbon bodies which may be carried out in a short period of time, thereby obviating the long baking procedure which has heretofore been used.

Other objects and advantages of the invention will become known from the following description of the invention.

Basically, the method of the invention involves first mixing the carbon or graphite with a suitable diffusional bonding material. This mixture is then placed in a die of the proper shape and size to produce a carbon body of the desired dimensions and in which the mixture may be heated to temperatures which will effect a diffusional bonding of the particles. Pressure is then applied to the mixture and it is heated while maintaining it under a pressure preferably over about 2,000 pounds per square inch. The pressure is maintained on the mixture until bonding is completed.

The diffusional bonding material serves to act as a sintering aid and results in a diffusional bonding of the carbon particles. Further, the addition of the diffusional bonding materials materially increases the mechanical strength and renders the carbon body less permeable to diffusible fission products.

Diffusional bonding materials which produce the desired results are the metals selected from the group consisting of zirconium, niobium (colunbium), molybdenum, titanium, nickel, chromium, and silicon, and compounds of these metals which will be readily converted to the metal and thence to the carbide by heat in a reducing atmosphere.

It has been determined that the bonding is completed, when employing the method of the invention, in a period of less than about one hour, often in a period of from 5 to 30 minutes, as compared to periods of as long as several weeks required for baking when the prior art methods are employed. Moreover, the carbon body made by this method is also more dimensionally accurate, is mechanically strong, and is otherwise more satisfactory than carbon bodies made by the prior art methods.

It has also been found that, if the mixture of carbon and bonding material to be compacted is heated to the desired temperature in such a way that the entire body is heated substantially uniformly to the same temperature for substantially identical periods of time, the dimensional stability, and mechanical strength of the ultimate body are increased, as is its imperviousness. It has been found that uniform heating may be accomplished by pressing the mixture in a suitable die and passing high level electrical currents through the body for the desired period as it is being pressed. The current density and other current characteristics are chosen to produce and maintain the proper temperature for bonding over the heating and pressing period.

Also, it has been found that by correlating the size ranges of the carbon, the proportion of the diffusional bonding material, and the temperatures and pressures employed in the pressing operation, a more impervious, mechanically stronger body can be produced.

The following are specific examples of various means of carrying out a process in accordance with the principles of the invention.

*Example 1*

Reactor grade graphite or carbon is mixed with 4 percent by weight of zirconium hydride. The mixture is placed in a mold having the dimensions of the body to be produced. Desirably, the carbon is prepared in the proper size range, which has been found to be such that it will pass through a 100 mesh screen. The zirconium hydride is in particulate form and is also sized to pass a 100 mesh screen.

Pressure of about 4,000 pounds per square inch is applied to the mixture in the die through a pressure plate, and the die and mixture are heated in a reducing atmosphere to a temperature of about 1600° C. The heating is continued for about 30 minutes, at which time substantially all of the gas and volatiles are evolved from the body and diffusional bonding has been accomplished. The body is slowly cooled, and it will be found that the cooled body is compact, has low porosity, and is mechanically strong.

Prior to use, the body can be reheated in a vacuum to remove any absorbed gases. The heating prior to use should be to a temperature well above the temperature to which the body will be subjected during use in the reactor.

*Example 2*

The procedure of Example 1 is followed but the heating is accomplished by passing an electrical current through the material in the die. This is accomplished by connecting the pressure plate in the die to one terminal of a source of electrical current and connecting a conductor in the base of the die to the other terminal. An electrical current of a magnitude sufficient to produce the temperature of 1600° C. is applied, which temperature is maintained until substantially all gas and volatiles are evolved. The resulting body is strong and relatively non-porous.

*Example 3*

Carbon or graphite sized to pass 200 mesh but to be caught on 325 mesh screens is mixed with about 3 percent by weight finely divided metallic niobium. This mixture is pressed in the die and heated in a reducing atmosphere to about 1700° C., the pressure in the die being about 4,000 pounds per square inch. The heating is conducted for 15 minutes, after which time it is slowly cooled. A diffusional bonding of the particles is effected and the resulting carbon body is strong and relatively non-porous.

*Example 4*

The process of Example 1 is carried out with 4 percent by weight of finely divided titanium oxide substituted for the zirconium hydride under the same conditions with substantially the same results.

*Example 5*

The process of Example 3 is carried out with 3 percent by weight of finely divided silicon metal substituted for the zirconium hydride under the same conditions, with substantially the same results.

In a similar manner molybdenum, nickel, and chromium and their compounds may be employed to effect a diffusional bond.

As has been pointed out above, the size range of the carbon employed is of importance in obtaining the desired properties of strength and relative non-porosity. Preferably, the carbon should be sized to pass through a 100 mesh screen and desirably it should be of such a size that it passes through a 200 mesh screen but is held on a 325 mesh screen.

The amount of diffusional bonding material employed may vary from about 1 to 10 percent by weight, based upon the weight, the preferred amount being in the range of from about 3 to 5 percent by weight, and it is desirably sized to correspond to the same screen sizes as have been outlined above for the carbon.

As has been pointed out, the pressure should be over about 2,000 pounds per square inch, the upper limit being determined for all practical purposes by the physical strength of the equipment available. However, the preferred pressure is over 3,000 pounds per square inch. As to temperature, this, too, can vary over a wide range. The diffusional bonding takes place at temperatures of about 1500° C. or over; however, for optimum strengths and non-permeability it is desirable to maintain the heating in the range of from about 1500° C. to 1800° C.

The time of heating is, of course, that required to effect a volatilization of the volatile materials in the green carbon material and to effect diffusional bonding. When the method of the invention is employed, the heating usually requires one hour or less and under most conditions the heating period need only require from 5 to 30 minutes.

Generally, it may be stated that similar results may be obtained at somewhat lower temperatures by raising the pressure under which the material is pressed so that by adjusting the amount of pressure it is possible to lower the temperature somewhat.

Also, in practicing the method of the invention, it is sometimes desirable to employ a preliminary cold pressing operation to aid in handling the green material. When this is done a small amount of readily volatizable binder such as tar or the like may be added to provide a low strength bond which will maintain the shape of the body after a cold pressing operation. The cold pressed body may then be hot pressed in accordance with the invention to provide the ultimate bonding and densification.

Carbon bodies made in accordance with this invention have been found to be extremely dense and have a low diffusion constant. Further, by the use of the invention, dense, strong carbon bodies having especially good dimensional accuracy may be produced in short periods of time, thereby avoiding the laborious and time consuming operations which were required by the prior art methods.

Various features of the invention are set forth in the appended claims. In the claims, the term carbon should be construed to mean carbon in any of its forms, e.g., amorphous carbon or graphite, carbon in crystalline form.

We claim:

1. The method of making a carbon body for use in a nuclear reactor which comprises making a finely divided mixture of carbon, and of less than about 10 weight percent of a diffusional bonding material selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per square inch, the entire body of said mixture being heated to a substantially uniform temperature.

2. The method of making a carbon body for use in a nuclear reactor which comprises making a finely divided mixture of carbon, and of less than about 10 weight percent of a diffusional bonding material selected from the class consisting of zirconium, niobium, molybdenum, titanium, nickel, chromium, silicon and decomposable compounds thereof, heating said mixture to a temperature of from about 1500 to 1800° C. at which temperature diffusional bonding will be effected while maintaining it under a mechanical pressure of over about 3,000 pounds per square inch, the entire body of said mixture being heated to a substantially uniform temperature.

3. The method of making a carbon body for use in a nuclear reactor which comprises making a finely divided mixture of carbon, and of less than about 10 weight percent of a diffusional bonding material selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per spuare inch, the entire body of said mixture being heated to a substantially uniform temperature by passing an electric current through said mixture to heat it to the bonding temperature.

4. The method of making a carbon body for use in a nuclear reactor which comprises making a finely divided mixture of carbon and from 1 to 10 percent by weight of a diffusional bonding material selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per square inch, the entire body of said mixture being heated to a substantially uniform temperature.

5. The method of making a carbon body for use in a nuclear reactor which comprises making a mixture of carbon sized to pass a 100 mesh screen, and from 1 to 10 percent by weight of a diffusional bonding material sized to pass a 100 mesh screen, said diffusional bonding material being selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per square inch, the entire body of said mixture being heated to a substantially uniform temperature.

6. The method of making a carbon body for use in a nuclear reactor which comprises making a finely divided mixture of carbon, and from 3 to 5 percent by weight of a diffusional bonding material selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per square inch, the entire body of said mixture being heated to a substantially uniform temperature.

7. The method of making a carbon body for use in a nuclear reactor which comprises making a mixture of carbon sized to pass a 200 mesh screen and to be retained on a 325 mesh screen, and from 1 to 10 percent by weight of a diffusional bonding material sized to pass a 200 mesh screen and to be retained on a 325 mesh screen, said diffusional bonding material being selected from the class consisting of zirconium, niobium, molybdenum, titanium, nickel, chromium, silicon and decomposable compounds thereof, heating said mixture to a temperature of at least 1500° C. at which temperature diffusional bonding will be effected while maintaining it under a mechanical pressure of over about 3,000 pounds per square inch, the entire body of said mixture being heated to a substantially uniform temperature.

References Cited in the file of this patent
UNITED STATES PATENTS

| | | |
|---|---|---|
| 1,756,857 | Gilson | Apr. 29, 1930 |
| 2,195,297 | Engle | Mar. 26, 1940 |
| 2,270,199 | Thrune | Jan. 13, 1942 |
| 2,331,479 | Krellner | Oct. 12, 1943 |

OTHER REFERENCES

Bridgman: "An Experimental Contribution to the Problem of Diamond Synthesis," The Journal of Chemical Physics, vol. 15, No. 2, February 1947, pp. 92–98.